United States Patent [19]

Sellers

[11] 3,959,879
[45] June 1, 1976

[54] ELECTRICALLY POWERED GRASS TRIMMER

[75] Inventor: Jerry W. Sellers, Lexington, Tenn.

[73] Assignee: Rockwell International Corporation, Pittsburgh, Pa.

[22] Filed: Dec. 6, 1974

[21] Appl. No.: 530,338

Related U.S. Application Data

[62] Division of Ser. No. 335,928, Feb. 26, 1973, Pat. No. 3,886,716.

[52] U.S. Cl. .............................. 30/276; 30/DIG. 1
[51] Int. Cl.² ........................................... A01G 3/06
[58] Field of Search ............... 30/DIG. 1, 263, 264, 30/276, 220, 240, 347; 56/17.1, 17.4, 17.5, 10.1, 295

[56] References Cited
UNITED STATES PATENTS

| | | | |
|---|---|---|---|
| 3,077,664 | 2/1963 | Murawski | 30/276 |
| 3,831,278 | 8/1974 | Voglesonger | 30/276 |
| 3,858,383 | 1/1975 | Glover | 56/17.4 X |

Primary Examiner—Al Lawrence Smith
Assistant Examiner—J. C. Peters

[57] ABSTRACT

An electrically powered grass trimmer with novel provision on the housing for maintaining the motor and housing halves in assembled condition.

2 Claims, 24 Drawing Figures

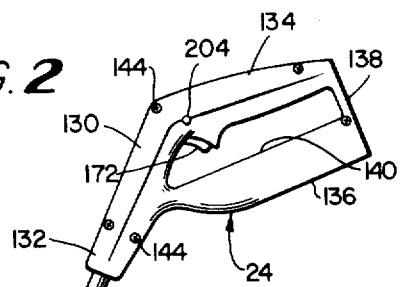
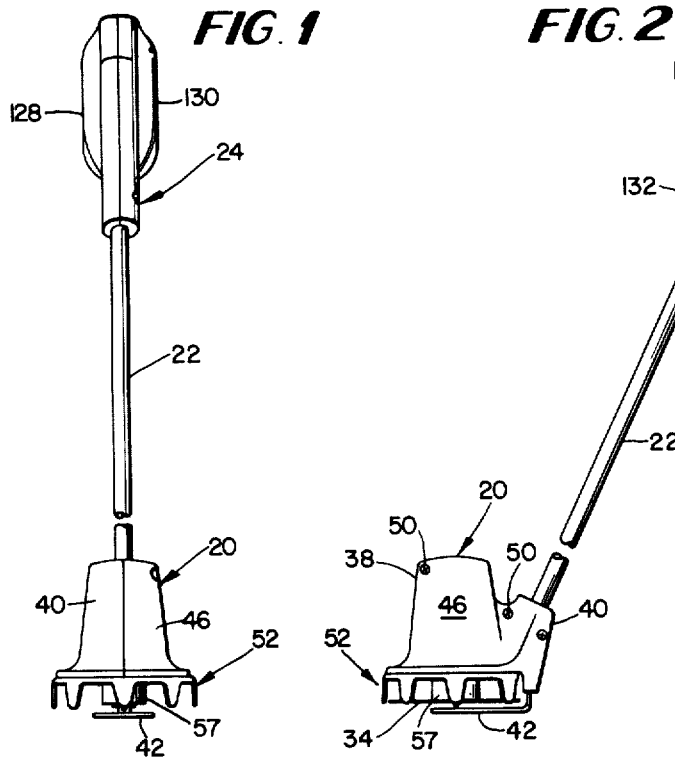
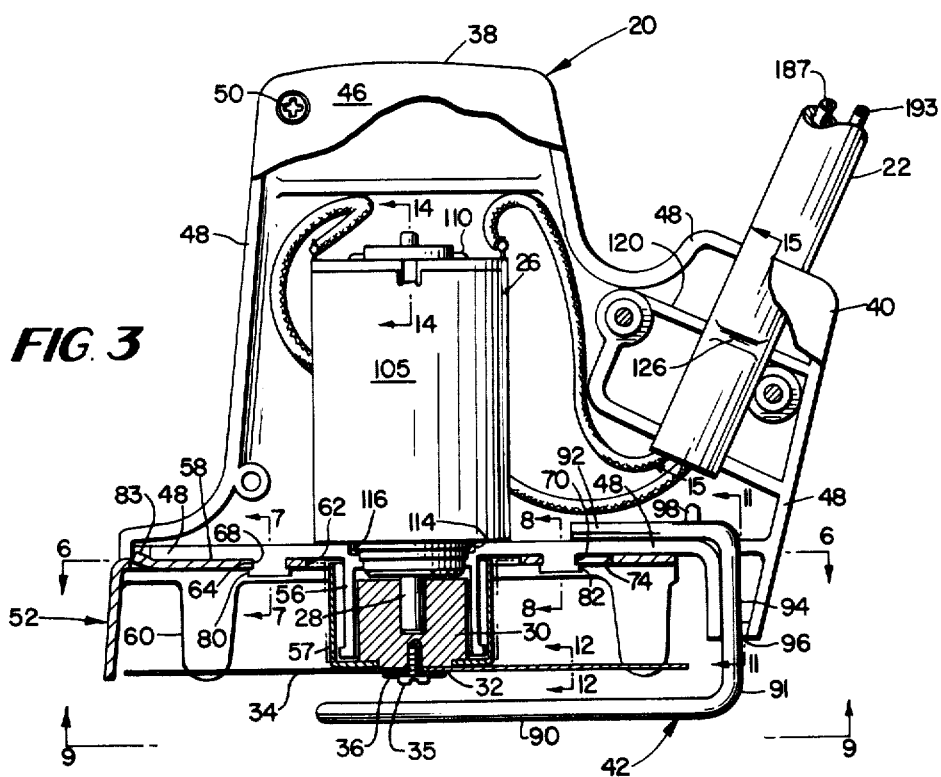

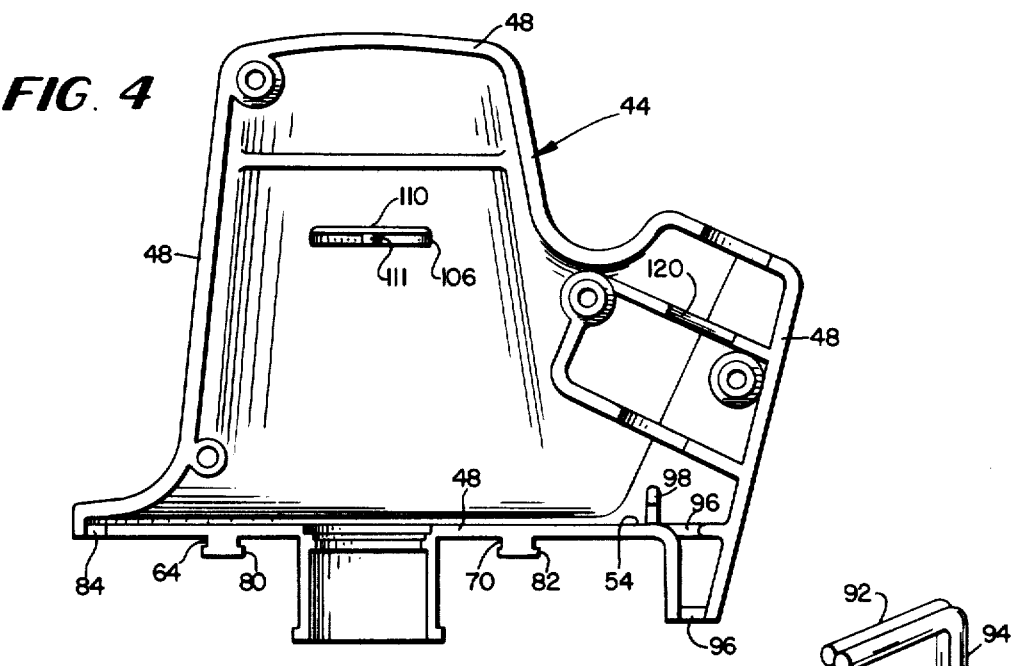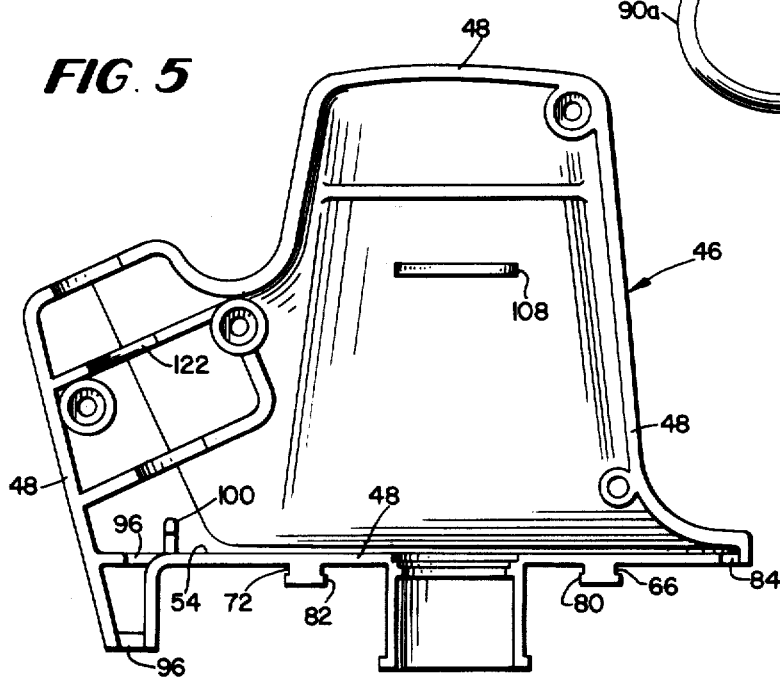

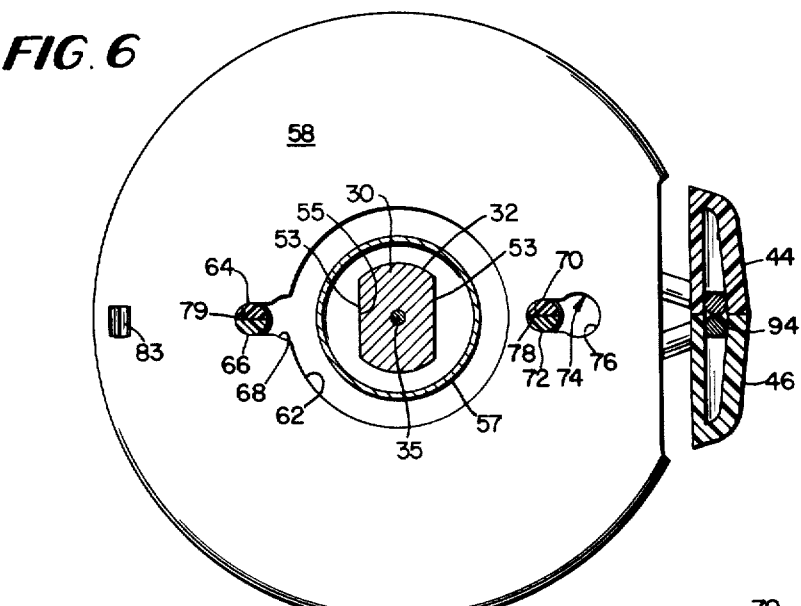
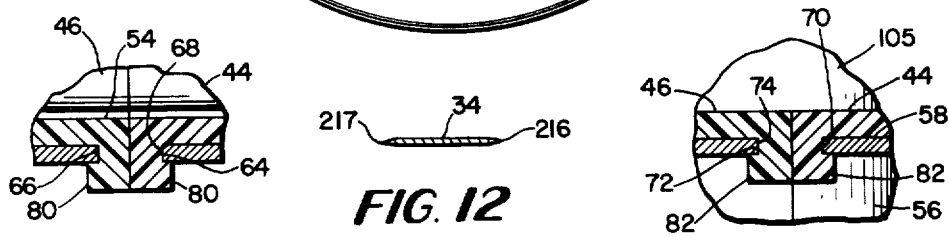
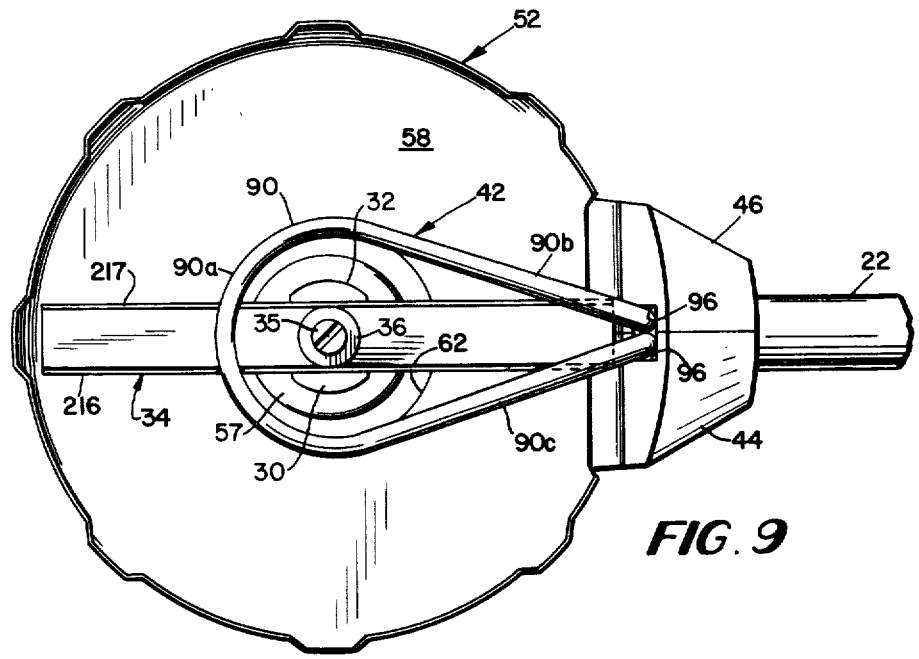

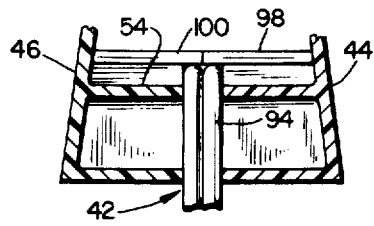
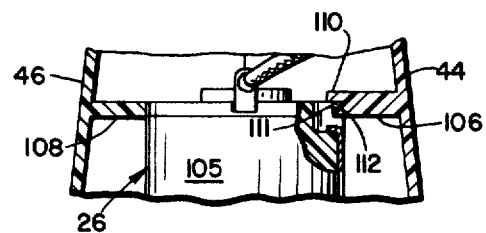
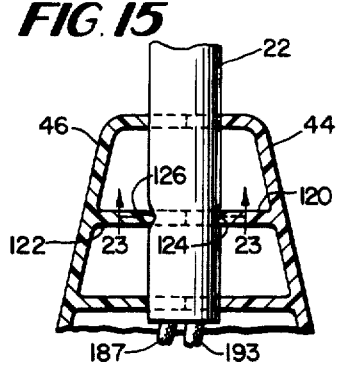
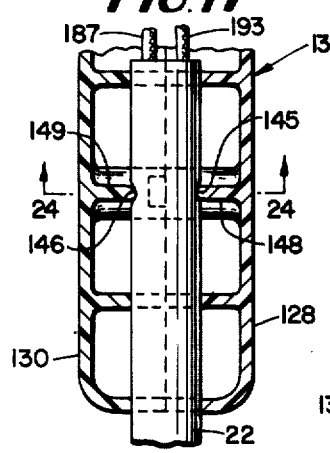
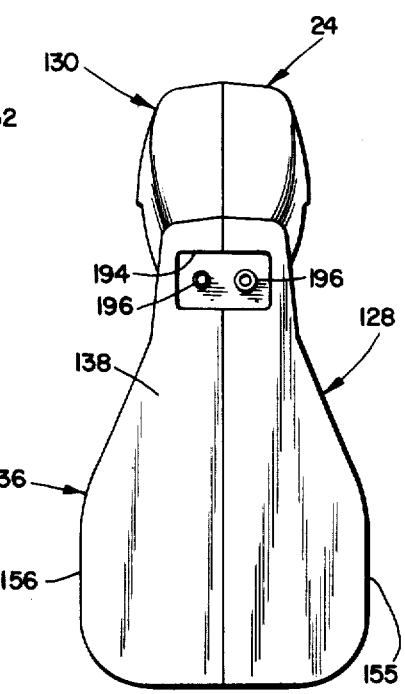
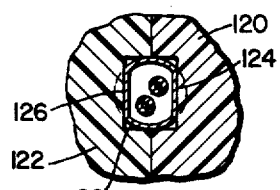
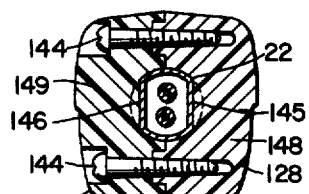
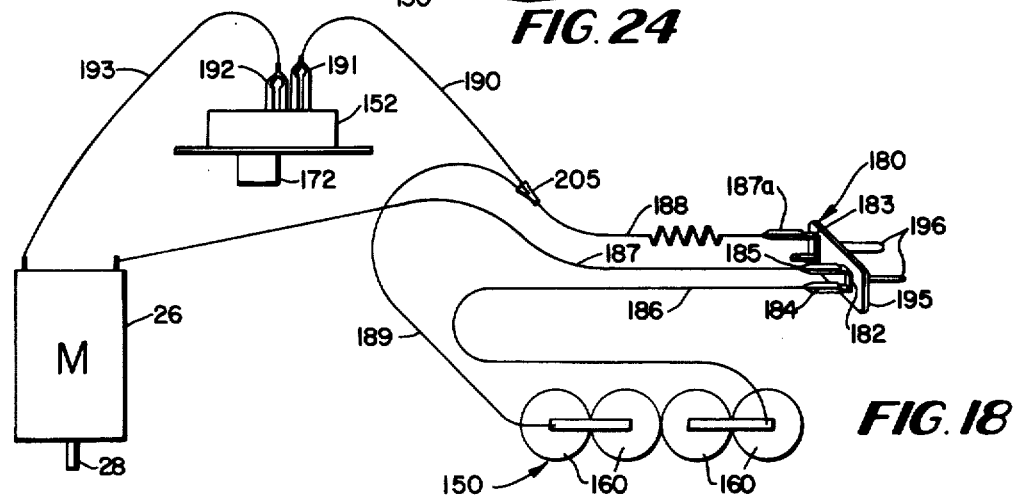

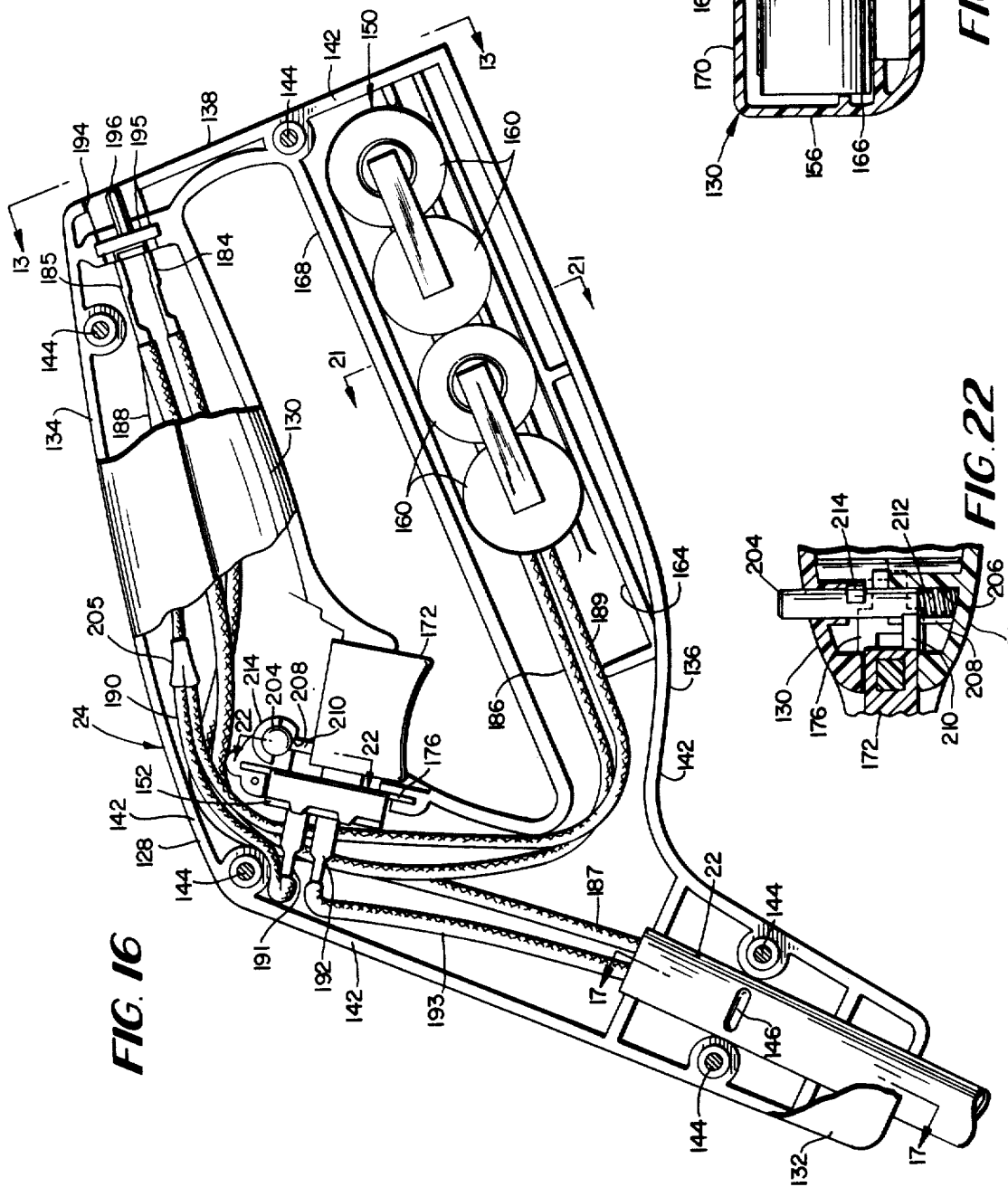

ELECTRICALLY POWERED GRASS TRIMMER

Field of the Invention

This application is a division of application Ser. No. 355,928, filed Feb. 26, 1973, now U.S. Pat. No. 3,886,716.

This invention relates to electrically powered cutting tools and is especially concerned with grass trimmers and the like.

Electrically powered grass trimmers, edger and edger/trimmers of the type to which this invention is particularly directed generally comprises a motor housing, an electric motor in the motor housing, a cutting blade located exteriorly of the motor housing and drive connected to the motor for rotation about a pre-selected axis, an elongated, tubular member or handlebar extending from the motor housing, and a handle grip positioned on the handlebar remote from the motor housing.

SUMMARY AND OBJECTS OF THIS INVENTION

A major object of this invention is to provide a novel lawn care cutting tool.

A more specific major object of this invention is to provide an electrically powered grass trimmer with a novel support heel that limits the approach of the cutting blade to the ground.

According to the specific embodiment of this invention, the support heel is a one-piece rod or other elongated structural member that is carried by the motor housing and that is formed with an intermediate looped portion. The looped portion is spaced below the grass-cutting blade, is essentially parallel thereto, and is adapted to rest on the ground to limit the approach of the blade to the ground.

The motor housing is a split construction that is longitudinally divided into a pair of separately formed mating shells. The ends of the one-piece support heel rod are separably trapped between the motor housing shells to confine the support heel against the movement relative to the motor housing only by separable seating surface engagement with interior surfaces of the motor housing shells.

Thus, in addition to providing a support heel of uniquely simplified, inexpensive construction, this invention provides for a novel arrangement whereby the one-piece support heel rod is secured to the motor housing without fasteners.

The support heel of this invention effects the cutting of the grass to a uniform, pre-selected height to provide a neat, manicured appearance of the cut turf.

Accordingly, a more specific object of this invention is to provide in a grass trimmer a novel one-piece support member that limits the approach of the cutting blade to the ground.

Another specific object of this invention is to provide a grass trimmer combination wherein the support for limiting the approach of the cutting blade to the ground is held in place only by separable seating surface engagement with interior surfaces of separately formed mating shells that form the motor housing.

Prior to this invention the motor housings of grass trimmers, edgers and other lawn care and gardening tools have been longitudinally split into a pair of separately formed mating shells. These motor housing shells are typically detachably secured together only by a multiplicity of screws.

In contrast to the foregoing, this invention provides a novel split motor housing and blade guard construction whereby the blade guard, which is carried by the motor housing, performs the additional function of detachably securing the separately formed motor housing shells together along the bottom wall region of the motor housing. Hence, the number of screws needed for securing the motor housing shells together is reduced as compared with prior constructions.

According to the specific embodiment of this invention the separately formed motor housing shells are formed with one or more pairs of depending mating posts that extend with a snug, tight fit through apertures in the base of the blade guard to detachably secure the motor housing shells together along bottom wall portions of the shells. The blade guard has a depending, blade-guarding skirt around the cutting blade.

With the foregoing in mind, another major object of this invention is to provide a novel grass trimmer in which the bottom wall portions of the mating motor housing shells are detachably secured together by a blade guard.

Another major object of this invention is to provide a novel battery powered lawn care cutting tool in which the batteries are mounted in a longitudinally split handle and battery case and are held in place only by separable seating surface engagement with interior surfaces of the separately formed mating shells that make up the handle and battery case.

According to the specific embodiment of this invention, the split battery and handle case, which is mounted on the end of the handlebar remote from the motor housing, is formed with a handle grip and a battery housing. The separately formed, mating shells of the battery and handle case have first mating portions that define the handle grip and further mating portions that define the battery housing. The handle grip and battery housing extend rearwardly from the handlebar, and the battery housing is spaced below the handle grip so that an aperture is formed between the handle grip and the battery housing to enable the user to grasp the handle grip without grasping the battery housing. The batteries, which may be secured together as a pack or a unit, are removably held in place only by separable seating surface engagement with the interior shells surfaces that define the battery housing. This construction eliminates the need for fasteners and brackets or other special parts for securing the batteries in place.

The batteries making up the battery pack are advantageously arranged in side-by-side relation and extend transversely of the interface between the mating shells of the split handle grip and battery case to more efficiently utilize the space in the battery housing as compared with the usual longitudinal or end-to-end battery arrangement.

Accordingly, another important object of this invention is to provide for a novel battery powered lawn care cutting tool wherein the batteries are mounted in side-by-side relation in the battery housing portion of the longitudinally split handle and battery case and extend transversely of the interface between the mating, separately formed shells that make up the handle and battery case.

According to another feature of this invention a terminal block, which is adapted to selectively be connected to a recharging source of power for the batteries, is conveniently located at the rearward end of the previously described handle grip portion of the handle and battery case.

Another important object of this invention is to provide a novel construction whereby the tubular elongated handlebar of the electrically powered lawn care cutting tool is confined against rotational and longitudinal movement relative to the motor housing and also to the handle grip on the handlebar.

In the specific embodiment of this invention, the motor housing and handle grip are each longitudinally split into a pair of mating separately formed shells. One end of the elongated handlebar is clamped between the mating motor housing shells, and the other end of the handlebar is clamped between the mating handle case shells. The tubular handlebar wall is indented in the region where it is clamped between the motor housing shells to provide a pair of outwardly opening, circumferentially spaced apart grooves. Ribs or inwardly projecting portions of the motor housing shells seat in these grooves to confine the handlebar against longitudinal and rotational movement relative to the motor housing. A corresponding cooperating rib and indented groove construction is provided to confine the split handle grip against longitudinal and rotational movement relative to the handlebar. In addition to eliminating the need for fasteners, this cooperating rib and indented groove construction is advantageous because it enables the tubular wall of the handlebar to be imperforate throughout its entire length.

According to another feature of this invention, a cylindrically encased motor is enclosed in the split motor housing and is held in place only by separable seating surface engagement with interior surfaces of the separately formed shells that make up the motor housing.

Further objects and features of this invention will appear as the description proceeds in connection with the below-described drawings and the appended claims.

DESCRIPTION OF DRAWINGS

FIG. 1 is a front elevation of a battery powered grass trimmer incorporating the principles of this invention;

FIG. 2 is a side elevation of the trimmer shown in FIG. 1;

FIG. 3 is an enlarged, fragmentary, partially longitudinally sectioned side elevation of the grass trimmer with the motor housing partially broken away to illustrate interior details;

FIG. 4 is an interior side elevation of the right-hand shell of the longitudinally split motor housing shown in FIGS. 1-3;

FIG. 5 is an interior side elevation of the left-hand shell of the longitudinally split motor housing shown in FIGS. 1-3;

FIG. 6 is a section taken substantially along lines 6—6 of FIG. 3;

FIG. 7 is a section taken substantially along lines 7—7 of FIG. 3;

FIG. 8 is a section taken substantially along lines 8—8 of FIG. 3;

FIG. 9 is a bottom plan view of the grass trimmer as viewed from lines 9—9 of FIG. 3;

FIG. 10 is a perspective view of the support heel shown in FIGS. 1-3;

FIG. 11 is a section taken substantially along lines 11—11 of FIG. 3;

FIG. 12 is a section taken substantially along lines 12—12 of FIG. 3;

FIG. 13 is a rear elevation as viewed from lines 13—13 of FIG. 16;

FIG. 14 is a section taken substantially along lines 14—14 of FIG. 3;

FIG. 15 is a section taken substantially along lines 15—15 of FIG. 3;

FIG. 16 is an enlarged, fragmentary, partially longitudinally sectioned elevation of the handle grip end of the grass trimmer shown in FIG. 1, with the handle and battery case partially broken away to illustrate interior details;

FIG. 17 is a section taken substantially along lines 17—17 of FIG. 16;

FIG. 18 is a partially schematic electrical diagram of the battery powered circuit for energizing the motor shown in FIG. 3;

FIGS. 21 and 22 are sections taken respectively along lines 21—21 and 22—22 of FIG. 16; and FIGS. 23 and 24 are sections that are taken along lines 23—23 and 24—24 of FIGS. 15 and 17 respectively.

DETAILED DESCRIPTION

Figure 19:
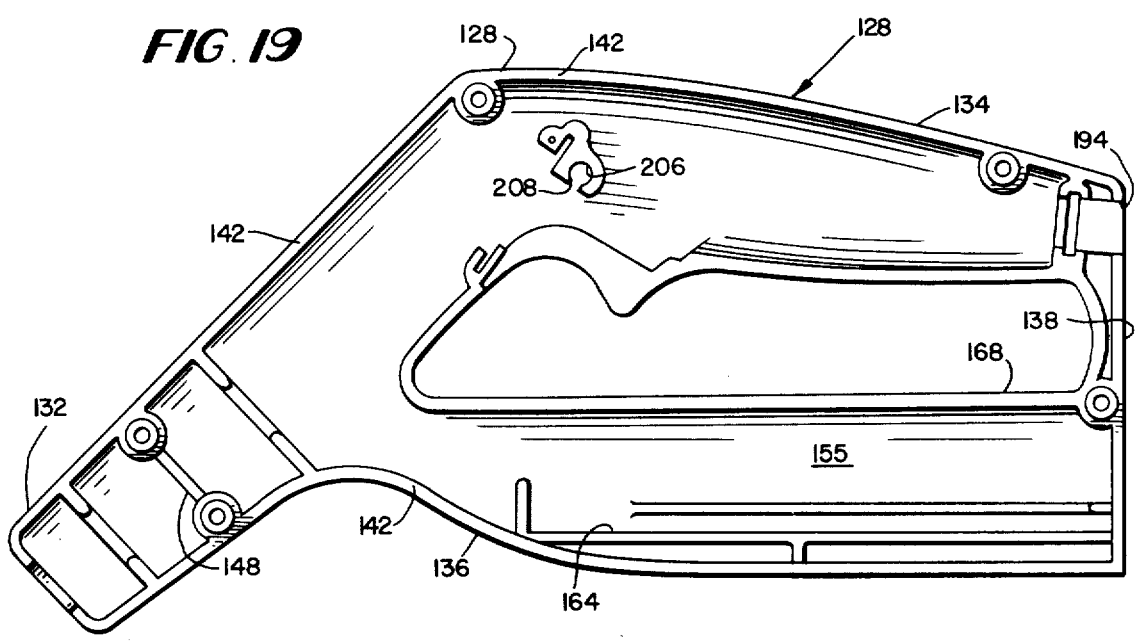
FIG. 19 is an interior side elevation of the right-hand shell of the longitudinally split handle and battery case shown in FIGS. 1, 2 and 16.

Although the invention is described herein as being incorporated into a battery powered grass trimmer, it will be appreciated that certain features of this invention are equally applicable to lawn edgers, edger/trimmers and similar cutting tools. It also will be appreciated that a number of features of this invention are applicable to trimmers, edgers and other tools that are powered from non-battery electrical sources. The expression "lawn care tool" as used herein is intended to cover grass trimmers, lawn edgers and tools that are adapted to both cut grass and edge lawns.

Referring to the drawings and particularly to FIGS. 1 and 2, the battery powered grass trimmer incorporating the principles of this invention generally comprises a hollow, longitudinally split, clam shell type motor housing 20, an elongated, straight, tubular handlebar or handle-mounting member 22, and a handle and battery case 24. As shown in FIG. 3, an electric motor 26 is mounted in housing 20 and has an armature shaft 28. A flywheel hub 30, which has a blind bore coaxially receiving the lower end of shaft 28, is pressed on to the lower end of shaft 28 for rotation therewith. A straight, flat-sided, one-piece rotary cutting or trimmer blade 34 is detachably fixed to hub 30 by a screw 35. Screw 35 extends freely through a central aperture in blade 34 and is threaded into a tapped bore that is formed in hub 30 in axial alignment with the blind bore that receives the lower end of shaft 28. Blade 34 seats against the flat face of a depending boss portion 32 that is integral with hub 30. A washer 36 is clamped between the head of screw 35 and the bottom side of blade 34. Blade 34 is confined between washer 36 and boss portion 32. Washer 36 is capable of acting as a slip clutch in that it enables hub 30 to rotate relative to blade 34 in the event that blade 34 strikes an obstruction during a grass trimming operation.

Blade 34 rotates about the axis of shaft 28. When the grass trimmer is disposed in its normally operative, upright position as shown in FIGS. 1–3, blade 34 is horizontally oriented and the rotational axis of shaft 28 is substantially vertical.

As shown in FIGS. 1–3, housing 20 is formed with a hollow motor-receiving body portion 38 and a hollow boss portion 40. Motor 26 is received in body portion 38, and the lower end of the tubular handle bar 22 is received in boss portion 40. A one-piece, rigid, anti-scalping heel 42 is carried by housing 20 and is adapted to rest on the ground to support the trimmer as it is guided by the user over the surface during a grass-cutting operation. Heel 42 limits the approach of blade 34 to the ground and will be described in detail later on.

As shown in FIGS. 1, 4 and 5, housing 20 is longitudinally divided into two mating, generally complementary, separately formed shells 44 and 46 to provide a clam shell type enclosure for motor 26. Shells 44 and 46 are separately molded from a suitable, electrically non-conductive or insulating plastic material and have oppositely dished curvatures to define an interior cavity for receiving motor 26.

Shells 44 and 46 are formed with mating longitudinal edge surfaces indicated at 48 in FIG. 3. These edge surfaces 48 seat against each other in a plane that longitudinally and medially intersects body portion 38 and boss portion 40. Thus, shells 44 and 46 respectively define mating halves of body portion 38 and boss portion 40. The interface between shells 44 and 46 is in a plane that contains the rotational armature shaft axis of motor 26 and the longitudinal axis of handlebar 22.

Shells 44 and 46 are rigidly secured together by screws 50 (see FIG. 2) and by a rigid one-piece blade guard 52 (see FIGS. 1–3). Guard 52 secures shells 44 and 46 together along the bottom of housing 20 in a manner to be described in detail later on. Screws 50 extend through smooth walled bores in one of the housing shells and are threaded into aligning bores in the other of the housing shells.

As shown in FIG. 3, housing 20 is formed with a flat bottom wall 54 and a hollow, depending boss portion 56. Bottom wall 54 and boss portion 56 are longitudinally split by the split clam shell housing construction such that complementary halves of bottom wall 54 and boss portion 56 are respectively defined by shells 44 and 46. Hub 30 coaxially extends into boss portion 56. Boss portion 32 is below boss portion 56.

An upwardly opening cup 57, which is mounted between blade 34 and bottom wall 54, coaxially receives boss portion 56. The bottom of cup 57 is centrally formed with an aperture 55 (see FIG. 6) which interfittingly receives boss portion 32.

As shown in FIG. 6, boss portion 56 is formed with a pair of straight flats 53 on diametrical sides thereof, and aperture 55 has corresponding straight edges that seat against flats 53 with the result that cup 57 will rotate with hub 30. Because of aperture 55, the bottom wall of cup 57 is in the form of a flange that seats between the bottom face of hub 30 and blade 34 to confine cup 57 against axial movement relative to the assembly of shaft 28, hub 30 and blade 34. Rotation of cup 57 with hub 30 prevents cut grass from entering the clearance space between hub 30 and boss portion 56 where it could stall the motor by clogging or wrapping around the hub.

Referring to FIGS. 3 and 6, blade guard 52, which is formed separately from housing 20, has a flat-sided plate or base portion 58 and a scalloped skirt portion 60. Skirt portion 60 depends from base portion 58. Base portion 58 separably seats against the bottom side of wall 54. Boss portion 56 coaxially extends through a central aperture 62 in base portion 58. Skirt portion 60 peripherally surrounds blade 34 to act as a guard therefor.

Referring to FIGS. 3–7, shells 44 and 46 are respectively formed with complementary post portions 64 and 66 that depend from bottom wall 54. Post portions 64 and 66, which have opposed, abutting flat side faces, extend through a slot or notch 68 (FIG. 6) in the blade guard base portion 58. Slot 68 opens radially into aperture 62.

As shown in FIGS. 3–6 and 8, shells 44 and 46 are respectively formed with further complementary post portions 70 and 72 that also depend from bottom wall 54. Post portions 70 and 72, which have opposed, abutting flat side faces, extend through a portion of an aperture 74 (FIG. 6) in base portion 58.

Slot 68 and aperture 74 are so arranged on diametrically opposite sides of aperture 62 that a radial line passing through the center of aperture 62 also passes through the centers of aperture 74 and slot 68. The plane which contains the interface between shells 44 and 46 and which contains the rotational axis of motor 26 medially intersects blade guard 52 and passes radially through the centers of apertures 62 and 74 and slot 68.

As shown in FIG. 6, aperture 74, which has a keyhole configuration, is formed with a relatively large diametered portion 76 and with a relatively small diametered portion 78. In assembled relation, post portions 70 and 72 tightly and snugly extend through the smaller diametered portion 78 of aperture 74, and post portions 64 and 66 tightly and snugly extend through a small dimetered portion 79 of slot 68. Portion 79 is at the closed end of the slot. The mouth of slot 68, which opens radially into aperture 62, is wider than the diameter of portion 79.

As shown in FIGS. 3–5, 7 and 8, the bottom ends of post portions 64 and 68 are formed with radial complementary flanges 80. Similarly, the bottom ends of post portions 70 and 72 are formed with radial complementary flanges 82. The composite diameter of flanges 80 is greater than the diameter of the small diametered portion 79 of slot 68. Similarly, the composite diameter of flanges 82 is greater than the diameter of aperture portion 78. In this manner, blade guard 52 is confined against axial displacement between bottom wall 54 and flanges 80 and 82.

From the foregoing construction it will be appreciated that when post portions 64 and 66 extend through slot portion 79 and when post portions 70 and 72 extend through aperture portion 78, blade guard 52 will be detachably fixed to housing 20. To ensure that blade guard 52 is secured against radial movement relative to housing 20, base portion 58 is advantageously formed with a tab 83 (FIG. 3) that is bent upwardly to seat in opposed complementary notches 84 (see FIGS. 4 and 5). Notches 84 are formed in the bottom wall portions of shells 44 and 46 and open toward each other at the interface between shells 44 and 46.

To detach blade guard 2 from housing 20, tab 83 is bent down with a screwdriver or the like to clear notches 84. Guard 52 then may be slid forwardly along the radial line that passes through the centers of aperture 62, aperture 74, and slot 68 to a position where post portions 70 and 72 are in the large diametered portion 76 of aperture 74 and where post portions 64 and 66 are in the relatively wide mouth of slot 68. The width of the mouth of slot 68 is greater than the composite diameter of flanges 80, and the diameter of aperture portion 76 is greater than the composite diameter of flange 82. Thus, with post portions 64 and 66 positioned in the mouth of slot 68 and with post portions 70 and 72 positioned in the large diametered aperture portion 76, blade guard 52 may be detached from housing 20 by moving it axially of post portions 64, 66, 70 and 72.

To attach blade guard 52 to housing 20, post portions 64 and 66 are extended through the wide mouth of slot 68 and post portions 70 and 72 are extended through large diametered portion 76 of aperture 74. Blade guard 52 is then slid rearwardly relative to housing 20 along the radial line that passes through the centers of aperture 62, aperture 74, and slot 68 to tightly and snugly position post portions 64 and 66 in the small diametered end portion 79 of slot 68 and to tightly and snugly position post portions 70 and 72 in the small diametered portion 78 of aperture 74.

From the foregoing it will be appreciated that this invention provides for a simplified construction for quickly and easily detachably securing blade guard 52 to housing 20.

When blade guard 52 is positioned in such a manner that post portions 44 and 46 extend through the small diametered end portion 79 of slot 68 and post portions 70 and 72 extend through the small diametered portion 78 of aperture 74, post portions 64 and 66 will be tightly clamped together and post portions 70 and 72 will also be tightly clamped together. In this manner, blade guard 52 rigidly secures shells 44 and 46 together along bottom wall 54. Thus, blade guard 52 performs a dual function. First, it provides a guard around blade 34. Second, it detachably secures shells 44 and 46 along the bottom of housing 20 to eliminate the need for additional screws or other fastening elements. In the illustrated embodiment, only three screws are required along with blade guard 52 for rigidly and detachably securing shells 44 and 46 together.

As best shown in FIG. 10, heel 42 is formed from a one-piece, cylindrical rod or thick stiff wire 91 that is bent or shaped at an intermediate region to form a loop. The portion of rod 91 containing the loop is indicated at 90. The ends of the rod extending beyond loop portion 90 are in side-by-side parallel relation and are bent to form mutually perpendicular terminal and intermediate portions 92 and 94. Portion 94 extends perpendicularly between and joins portions 90 and 92. Portion 92 lies parallel with loop portion 90 and is bent forwardly to overlie loop portion 90.

Loop portion 90 is formed by an intermediate curved section 90a of rod 91 and two straight sections 90b and 90c of rod 91. Sections 90b and 90c are joined to the straight, parallel, side-by-side rod sections that form portion 94 and are angularly spaced apart at an acute angle. Section 90a extends between and integrally joins the spaced apart end regions of sections 90b and 90c remote from portion 94. The curvature of section 90a is substantially uniformly diametered. The longitudinal axis of the loop defined by sections 90a, 90b and 90c is parallel to the rotational axis of shaft 28. The rotational axis of shaft 28 passes centrally through the loop defined by sections 90a, 90b and 90c.

Heel 42 is supported from housing 20 in such a manner that loop portion 90 is spaced vertically below blade 34 and underlies blade 34 at a level below blade guard 52. When the grass trimmer is in its normal upright position shown in FIGS. 1–3, loop portion 90 extends horizontally and is closely parallel with blade 34.

As shown in FIGS. 3–5, the rearward ends of shells 44 and 46 are formed downwardly opening complementary notches 96 to receive intermediate portion 94. With the grass trimmer in its illustrated upright position, portion 94 extends upwardly through notches 96 and into the interior cavities defined by shells 44 and 46 at the rearward end of housing 20. Terminal portion 92 extends forwardly into the motor-receiving cavities of shells 44 and 46. Terminal portion 92 overlies and seats against bottom wall 54.

Still referring to FIGS. 3–5, shells 44 and 46 are respectively formed with aligned, opposing, transverse ribs 98 and 100. Ribs 98 and 100 are integral with and extend upwardly from the respective bottom wall portions of shells 44 and 46. The inner adjacent ends of ribs 98 and 100 extend to the interface between shells 44 and 46. As shown in FIG. 11, these inner ends of ribs 98 and 100 are formed with complementary notches.

Terminal portion 92, as best shown in FIG. 11, extends through the notches in the adjacent ends of ribs 98 and 100 so that it is confined between overlying end portions of ribs 98 and 100 and underlying bottom wall portions of shells 44 and 46. In this manner, upward or downward movement of heel 42 is prevented. Lateral movement is prevented by abutment of terminal portion 92 with adjacent edge surfaces of ribs 98 and 100. Thus, terminal portion 92 is trapped between edge surfaces of ribs 98 and 100. In addition, intermediate portion 94 of heel 42 is tightly and snugly clamped or trapped between the opposing edge surfaces of shells 44 and 46 in the region of notches 96.

Thus, when shells 44 and 46 are rigidly secured-together, it will be appreciated that heel portions 92 and 94 are securely trapped or clamped in place. Heel 42 is therefore held in place and supported from housing 20 solely by separable seating surface engagement with interior surfaces of shells 44 and 46. In the proper operative position of the grass trimmer, loop portion 90 rests evenly on the ground.

It will be appreciated that the foregoing construction of heel 42 is inexpensive to manufacture and requires no fasteners for securing it in place on housing 20. Heel 42 supports the grass trimmer as it is moved along the ground and maintains blade 34 at a pre-selected level about the ground to prevent blade 34 from scapling or digging into the lawn. Thus, when the grass trimmer is held in its proper operating position as illustrated in FIGS. 1–3, the grass will be cut to a uniform height to provide an even, manicured appearance.

Referring to FIGS. 3–5, motor 26, which is provided with a cylindrical casing 105, is confined between a pair of ears 106 and 108. Ears 106 and 108 are respectively formed integral with shells 44 and 46.

As best shown in FIG. 14, ears 106 and 108 are on diametrically opposite sides of motor 26 at the upper end thereof and have opposed arcuate edge surfaces that interfittingly seat against the upper region of casing 105. When shells 44 and 46 are rigidly secured together, the upper portion of motor 26 is thus radially and separably clamped between ears 106 and 108 to confine motor 26 against lateral displacement. Ear 108 has an extension or lip 110 that overlies and seats against the top end wall of motor 26 in such a manner that motor 26 is axially confined against movement between lip 110 and bottom wall 54.

Still referring to FIG. 14, ear 106 is integrally formed with an inwardly extending protrusion 111 that separably seats in a radially outwardly opening notch 112 in the top end wall of motor 26 to prevent rotational movement of casing 105.

As shown in FIG. 3, the bottom end wall of casing 105 is provided with an axially extending boss 114 that coaxially and interfittingly seats in a shallow well 116 in bottom wall 54 to properly position motor 26 in housing 20. Complementary halves of well 116 are formed by shells 44 and 46 respectively. Well 116 is axially aligned with boss portion 56.

From the foregoing, it will be appreciated that motor 26 is mounted in housing 20 without the use of fasteners of any kind and, instead, is held in place solely by separable seating surface engagement with interior surfaces of shells 44 and 46.

As shown in FIGS. 3 and 15, the lower end of handlebar 22 is clamped between the regions of shells 44 and 46 that define boss portion 40. In this manner, handlebar 22 is confined against lateral or transverse movement relative to housing 20 solely by separable seating surface engagement with opposing interior surfaces of shells 44 and 46.

To confine handlebar 22 against rotational and longitudinal movement relative to housing 20, shells 44 and 46 are respectively interiorly formed with mating, notched-out ribs 120 and 122 as best shown in FIG. 15. Ribs 120 and 122 extend transversely of handlebar 22, and handlebar 22 extends through the mating notched-out regions of ribs 120 and 122. Diametrically opposite regions of the lower end portion of handlebar 22 are indented to form circumferentially spaced apart, radially outwardly opening, substantially straight uncurved shallow grooves 124 and 126. The recessed, notched edge surfaces of ribs 120 and 122 seat in grooves 124 and 126 to prevent rotational and longitudinal movement of handlebar 22 relative to housing 20.

From the foregoing description it is clear that handlebar 22 is confined against movement relative to housing 20 solely by separable seating surface engagement with surfaces of shells 44 and 46. Furthermore, no apertures or holes are formed through handlebar 22 and no fastening elements extend into or through handlebar 22 to confine it against movement relative to housing 20.

As shown in FIGS. 1, 2 and 16, the handle and battery case 24 is mounted on the upper end of handlebar 22 in spaced relation from housing 20. Case 24, like housing 20, is of the split, clam shell construction and is longitudinally divided into two mating, generally complementary shells 128 and 130. Shells 128 and 130 are separately molded from a suitable, electrically insulating, plastic material. In assembled relation, shells 128 and 130 define mating, generally complementary halves of a collar or tubular end portion 132, a handle grip portion 134, and a battery housing portion 136.

Handle grip portion 134 and housing portion 136 are in spaced apart generally parallel relation and extend rearwardly from the tubular end portion 132. At the rearward end of case 24, shells 128 and 130 are respectively formed with mating, abutting ribs 138 that extend between portions 134 and 136. An elongated aperture 140 is defined between handle grip portion 134 and housing portion 136 to enable the user to grasp handle grip 134 in the palm of his or her hand. Aperture 140 is delimited by handle grip 134, portions 132 and 136, and ribs 138. The tubular end portion 132 coaxially receives the upper end of handlebar 22 as shown. Handlebar 22 thus opens at one end into case 24 and at the other end into housing 20.

Shells 128 ad 130 are formed with mating edge surfaces that are indicated at 142 in FIG. 16. These edge surfaces seat against each other in a plane containing the longitudinal axis of handlebar 22 and the rotational axis of motor 26. Shells 128 and 130 are rigidly and detachably secured together by screws 144 that extend through smooth walled bores in one of the shells and that are threaded into aligning bores in the other of the shells.

With reference to FIGS. 1, 16 and 17, handlebar 22 is clamped at its upper end between the mating portions of shells 128 and 130 that define tubular end portion 132. To prevent longitudinal and rotary movement of case 24 relative to handlebar 22, handlebar 22 is indented in diametrically opposite regions adjacent to the upper end thereof to define diametrically oppositely facing, circumferentially spaced apart, shallow, substantial straight uncurved grooves 146 and 145. Ribs 148 and 149, which are respectively integral with shells 128 and 130, respectively seat in grooves 145 and 146 to prevent longitudinal and rotary movement of case 24 relative to handlebar 22. Cooperation of ribs 148 and 149 with grooves 145 and 146 corresponds to the cooperation of ribs 102 and 104 and grooves 124 and 126. With this rib and groove construction, the need for forming apertures through handlebar 22 or for inserting fasteners through the tubular wall of handlebar 22 is avoided. Thus, the tubular wall of handlebar 22 throughout the entire length of the handlebar is imperforate.

As shown in FIG. 16, a battery pack 150 is mounted in housing portion 136 to supply the power for energizing motor 26. A switch 152 mounted in handle portion 134 is manually manipulatable to control energization of motor 26 with the power supplied by battery pack 150.

As shown in FIG. 18, motor 26 and switch 152 are connected in series across the power output terminals of battery pack 150. The conductors providing the electrical connections shown in FIG. 18 are generally indicated at 154 in FIG. 16. Battery pack 150 comprises a series of conventional batteries or cells 160. Batteries 160 each have a cylindrical casing and are secured together by a tape 162 to form the battery pack. Batteries 160 are electrically connected in series across the circuit branch containing switch 152 and motor 26. The number of batteries in pack 150 may be varied and depends upon the amount of power desired for operating motor 26.

Shells 128 and 130 are respectively formed with portions 155 and 156 (see FIGS. 19 and 20) that define mating halves of housing portion 136.

As best shown in FIGS. 16 and 21, batteries 160 are arranged in parallel side-by-side relation in housing portion 136. The interface between shells 128 and 130 is in a plane that contains the longitudinal axis of handlebar 22, that intersects batteries 160 and that extends normally of the parallel, longitudinal axes of batteries 160. All of the batteries for powering motor 26 are in housing portion 136 which extends rearwardly from tubular portion 132 as previously described.

Figure 20:
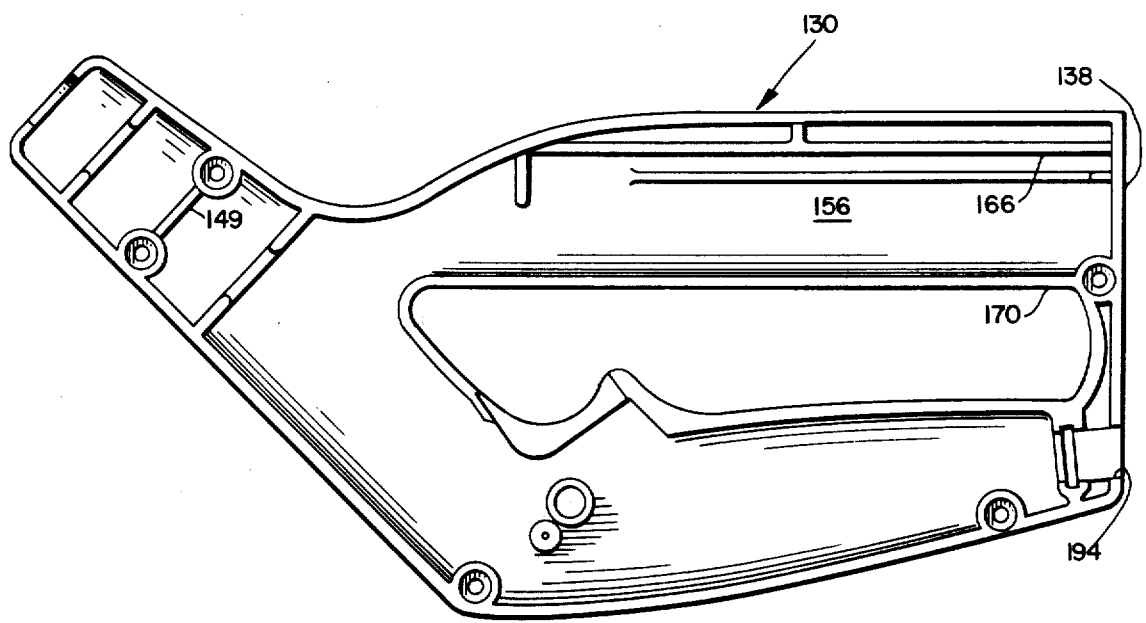
FIG. 20 is an interior side elevation of the left-hand shell of the longitudinally split handle and battery case shown in FIGS. 1, 2 and 16.

As shown in FIGS. 19–21, shell portions 155 and 156 are respectively formed with interior, straight, parallel ledges or shoulders 164 and 166. The top flat surfaces of shoulders 164 and 166 are contained in a plane that is parallel to and spaced from the longitudinal axes of batteries 160. In assembled relation, batteries 160 bridge the space between ledges 164 and 166 and seat on ledges 164 and 166.

Shell portions 155 and 156 are formed with complementary, mating walls 168 and 170 that delimit aperture 140. Walls 168 and 170 extend substantially parallel with ledges 164 and 166. As viewed from FIG. 21, the right-hand portions of batteries 160 are confined between ledge 164 and wall 168, and the left-hand portions of batteries 160 are confined between ledge 166 and wall 170. Ledges 164 and 166 and walls 168 and 170 thus confine and position battery pack 150 in housing portion 136.

Batteries 160 are separably trapped and clamped in place between shell portion 155 and 156 when shells 120 and 130 are secured together. Batteries 160 are thus held in place only by separable seating surface engagement with interior surfaces of shells 128 and 130 to eliminate the need for fasteners for securing battery pack 150 in place.

As shown in FIG. 16, switch 152 is provided with a spring biased trigger 172. Trigger 172 extends through mating openings in shells 128 and 130 on the underside of handle grip 134 adjacent to the juncture between handle grip 134 and tubular portion 132. Trigger 132 is positioned for manipulation by the user's index finger when he grasps handle grip 134 to squeeze the trigger upwardly and rearwardly to its switch-closing position.

As shown in FIG. 16, switch 152 is mounted in a bracket 176. Bracket 176 is received in mating, interior slots that are formed in shells 128 and 130 to secure switch 152 in place.

By mounting battery pack 150 in housing portion 136 below handle grip 134, handle grip 134 may be provided with a sufficiently slim configuration to be easily and comfortably gripped by user. Furthermore, the arrangement of batteries 160 in such a manner that their longitudinal axes are transverse to a plane extending between shells 128 and 130 provides for an efficient utilization of space within housing portion 136. The weight of battery pack 150 in case 24 counterbalances the weight of motor 26 and blade 34 to make the grass trimmer easy to handle.

As shown in FIG. 16, a terminal block 180 is mounted in the rearward end of handle grip 134 to provide for the recharging of batteries 160. Referring to FIG. 18, terminal block 180 comprises a pair of generally U-shaped terminal pins 182 and 183 within handle grip 134. Terminal clips 184 and 185, which are suitably fixed to a pair of insulated electrical conductors 186 and 187 are detachably connected to the legs of terminal pin 182. Conductor 186 is detachably electrically connected by a battery terminal to one of the output terminals of battery pack 150. Conductor 187 extends freely through handlebar 22 into housing 20 and is electrically connected to one of the operating terminals of motor 26. A terminal clip 187a, which is detachably connected to terminal pin 183, is fixed to a further conductor 188. Conductor 188, which contains a resistor, is electrically connected to ends of two electrically insulated conductors 189 and 190. Conductor 189 is detachably electrically connected by a further battery terminal clip or the like to the remaining output terminal of battery pack 150. Conductor 190 is electrically connected to a terminal clip 191 which, in turn, is detachably connected to an operating terminal of switch 152. A terminal clip 192, which is detachably connected to the other operating terminal of switch 152, is electrically connected to a further insulated electrical conductor 193. Conductor 193 extends freely through handlebar 22 and into housing 20 and is electrically connected to the remaining operating terminal of motor 26.

To replace battery pack 150, shells 128 and 130 are separated, and the battery terminal clips are disconnected from their associated battery terminals to permit the removal of the battery pack.

As best shown in FIGS. 22 and 13, terminal block 180 is also provided with a pair of contact pins 196 that extend into a rearwardly and outwardly opening recess 194 at the rearward end of handle grip 134. Complementary halves of recess 194 are formed by shells 128 and 130. Contact pins 196 are electrically connected to terminal pins 182 and 183 respectively. A female plug (not shown) of an unshown battery charger may be plugged into recess 192 to engage contacts 196 for recharging batteries 160. By virtue of being located at the rearward end of handle grip 134, terminal block 180 is easily accessible for electrical connection to the unshown battery charger.

Contact pins 196 and terminal pins 182 are mounted on a base 195 of insulating material. Base 195 is slidably received in grooves in shells 128 and 130. Base 195 is clamped or trapped in place between shells 128 and 130 and is held in place only by separable seating surface engagement with interior surfaces of shells 128 and 130.

From the foregoing circuit connections it will be appreciated that the circuit branch containing motor 26 and switch 152 are electrically connected across contact pins 196 in parallel with battery pack 150. Battery pack 150 is also electrically connected across contact pins 196.

Because of the previously described circuit connections and because of the convenient location of terminal block 180 at the rearward end of handle grip 134, battery pack 150 may easily be replaced with an alternate exterior source of electrical power. For example, pack 150 may be replaced with an optional battery pack in a shoulder-carried unit that may be carried by the operator of the grass trimmer. To accomplish this, conductor 189 is electrically disconnected from battery pack 150, and conductor 186 is electrically disconnected from terminal pin 182. Conductor 188 is electrically disconnected from terminal pin 183, and conductor 189 is electrically connected to terminal pin 183. The circuit branch containing motor 26 and switch 152 will therefore be connected electrically across terminal pins 182 and 183 and, consequently, across contact pins 196. A suitable exterior or external electrical power source (such as the shoulder carried battery unit mentioned above) when connected across contact pins 196 will therefore be effective to energize motor 26 upon closing switch 152.

Instead of an exterior battery pack, the grass trimmer may optionally be powered from an electrical outlet in a household by making the same circuit connection changes described in the preceding paragraph, thus utilizing power supplied by the power company serving the household. To utilize the household power source a small transformer may be required, and a suitable power cord may be connected between contact pins 196 and the stepped-down household power source.

From the foregoing description it is clear that no fasteners or other parts are disposed in or inserted into or through handlebar 22 except for the electrically insulated conductors 187 and 193. This construction therefore eliminates a source of problems in conventional construction in which fasteners or other parts extend into the handlebar and may rub or wear off the insulation on the conductors to cause a short circuit condition.

As shown in FIGS. 2, 16 and 23, the grass trimmer is provided with a spring-biased safety lock button 204. Lock button 204 has a cylindrical body that extends through an aperture in shell 130 with a sliding fit. The inner end of button 204 is slidably and coaxially received in a tubular well 206 that is interiorly formed in shell 128. Well 206 opens into the interior cavity space in handle grip 134 and has a longitudinally extending radially outwardly opening slot 208 that opens towards the rearward edge of trigger 172.

Lock button 204 is integrally formed with a radially extending stop abutment arm 210 that slidably extends through slot 208 to butt against the rearward edge of trigger 172 when trigger 172 is pulled rearwardly and when lock button 204 is in its undepressed, outwardly biased, illustrated position. A spring 212 is axially compressed between the inner end of lock button 204 and the bottom of well 206 to bias lock button 204 axially outwardly to a position where stop abutment arm 210 is in the path of movement of trigger 172 to its switch-on position.

The cylindrical body of lock button 204 is integrally formed with a radially outwardly extending shoulder 214 for limiting axial movement of lock button 204 in opposite directions. Outward axial displacement of lock button 204 under the biasing influence of spring 212 is limited by abutment of shoulder 214 with the interior surface of shell 130. Inward axial movement of lock button 204 against the bias of spring 212 is limited by abutment of shoulder 214 with the end of well 206.

When lock button 204 is in its outwardly biased, illustrated position the rearward edge of trigger 172 will butt against stop abutment arm 210 when trigger 172 is still pulled upwardly and rearwardly towards its switch-on position to thereby prevent trigger 172 from being moved to a position where it closes switch 152. Lock button 204 is located in a region on the side of handle grip 134 just above trigger 172 where it can be manipulated by the user's thumb simultaneously with the manipulation of trigger 172 by the user's index finger. By depressing, or more particularly pushing lock button 204 inwardly against the bias of spring 212, stop abutment arm 210 is moved towards shell 128 and out of the path of movement of trigger 172 to thereby permit trigger 172 to be pulled upwardly and rearwardly to its position where it closes switch 152 to energize motor 26.

As shown in FIGS. 9 and 12, blade 34 is advantageously beveled along both of its marginal side edges to provide two knife or cutting edges 216 and 217 which faces in opposite directions. Cutting edges 216 and 217 may extend the entire length of blade 34. With this construction two pair of diagonally related cutting edge portions are available for use. When one pair of diagonally related cutting edge portions becomes dull from use, blade 34 may be removed, flipped over or reversed and re-attached to flywheel 30 to put the previously un-used pair of diagonally related cutting edge portions into use. As a result, the usable life of blade 34 is effectively doubled.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In an electrically powered lawn care tool, a split housing longitudinally divided into a pair of separately formed mating shells, means securing said shells together, an electric motor disposed in said housing and having a casing, a blade located exteriorly of said housing and drive connected to said motor for rotation about a pre-selected axis, an elongated handlebar extending from said housing, and handle grip means positioned on said handlebar remote from said housing, said shells having abutting bottom wall portions that define a bottom wall of said housing, said shells being integrally formed with opposed ears extending radially of the motor rotational axis and interfittingly seating against said casing on diametrically opposite side of said motor to confine said motor against lateral movement, one of said ears being formed with a lip, and said motor being axially confined between said lip and said bottom wall, and coacting means on one of said ears and said casing for preventing rotation of said casing relative to said housing.

2. In an electrically powered grass trimmer, a split motor housing longitudinally divided into a pair of separately formed, mating shells, an electric motor mounted in said housing, a grass-cutting blade located below said housing and drive connected to said motor for rotation about a substantially vertical axis when said housing is in an upright position, an elongated member extending from said housing, handle means positioned on said elongated member remote from said housing, and means including a guard for said blade for detachably securing said shells together, wherein said shells are formed with abutting bottom wall portions that define the bottom wall of said housing, and wherein said guard has a base portion seated against the underside of said bottom wall and a blade-guarding skirt portion depending from said base portion and extending peripherally around said blade, said base portion being formed with first and second apertures, said shells being integrally formed with a first pair of mating post portions that depend from said bottom wall portion and seat against each other along the interface between said shells, said shells being further formed with a second pair of mating post portions that also depend from said bottom wall portions and seat against each other along the interface between said shells, said first pair of post portions extending snugly through a first region of said first aperture and said second pair of post portions extending snugly through a first region of said second aperture to secure said shells together along the interface between said bottom wall portions, each of said first and second apertures having a second region that is larger than said first region to freely receive their associated post portions, said guard being displaceable radially of said axis to position said first pair of post portions in said second region of said first aperture and to position said second pair of post portions in said second region of said second aperture, said guard being detachable from said housing upon positioning said first and second pairs of post portions in their associated second regions of said first and second apertures.

* * * * *